United States Patent
Dutta et al.

(10) Patent No.: US 8,151,329 B2
(45) Date of Patent: Apr. 3, 2012

(54) SECURE HANDLING OF STORED-VALUE DATA OBJECTS

(75) Inventors: Santanu Dutta, Cary, NC (US); Nils Rydbeck, Cary, NC (US)

(73) Assignee: Ericsson Inc., Plano, TX (US)

( * ) Notice: Subject to any disclaimer, the term of this patent is extended or adjusted under 35 U.S.C. 154(b) by 190 days.

(21) Appl. No.: 11/941,325

(22) Filed: Nov. 16, 2007

(65) Prior Publication Data

US 2008/0061137 A1     Mar. 13, 2008

Related U.S. Application Data

(62) Division of application No. 10/008,174, filed on Nov. 13, 2001, now Pat. No. 7,315,944.

(51) Int. Cl.
*G06F 7/04* (2006.01)

(52) U.S. Cl. ....... 726/5; 726/2; 726/3; 726/26; 382/115; 713/182; 713/185; 713/186; 705/65; 705/66; 705/67; 705/68; 705/69

(58) Field of Classification Search ............... 726/2, 3, 726/5, 26; 713/182, 185, 186; 382/115; 705/65–69

See application file for complete search history.

(56) References Cited

U.S. PATENT DOCUMENTS

| 6,088,450 | A  * | 7/2000  | Davis et al. | 713/182 |
| 6,230,268 | B1 * | 5/2001  | Miwa et al. | 713/176 |
| 6,722,986 | B1 * | 4/2004  | Lyons et al. | 463/29 |
| 6,996,716 | B1 * | 2/2006  | Hsu | 713/175 |
| 2001/0018660 | A1 * | 8/2001  | Sehr | 705/5 |
| 2002/0161722 | A1 * | 10/2002 | Matsushima et al. | 705/67 |
| 2003/0069967 | A1 * | 4/2003  | Vincent | 709/225 |
| 2003/0105641 | A1 * | 6/2003  | Lewis | 705/1 |
| 2004/0148410 | A1 * | 7/2004  | Howard et al. | 709/229 |

OTHER PUBLICATIONS

Garg, Rahul; Mittal, Parul A.; Agrawal, Vikas; Modani, Natwar: An Architecture for Secure Generation and Verification of Electronic Coupons, Jun. 2001, USENIX Association.*

* cited by examiner

*Primary Examiner* — Edan Orgad
*Assistant Examiner* — Roderick Tolentino
(74) *Attorney, Agent, or Firm* — Coats & Bennett, P.L.L.C.

(57) ABSTRACT

An approach to managing stored-value data objects, such as electronic tickets, comprises secure systems and procedures for ticket issuing, storage, and redemption. With these systems and procedures in place, stored-value data objects may be securely transferred to remote systems, such as a user's personal electronic device, for subsequent secure redemption, thus allowing the user to gain access to the desired goods or service upon redeeming the data object. Techniques provide secure delivery of the requested data object to the requesting device, and provide secure redemption and disposal of the data object. Ticket issuing systems may be Internet-accessible systems, and users may purchase and redeem tickets using mobile terminals or other devices adapted for wireless communication. Standardized WPKI and Internet access procedures may be employed in ticket issuance and redemption. Techniques further provide temporary and rapid verification data objects useful where rapid ticket verification is essential, such as mass transit systems.

24 Claims, 6 Drawing Sheets

SECURE HANDLING OF STORED-VALUE DATA OBJECTS

RELATED APPLICATIONS

This application claims priority under 35 U.S.C. §120 as a divisional of application Ser. No. 10/008,174 filed 13 Nov. 2001, the entire contents of which are incorporated herein by reference.

BACKGROUND OF THE INVENTION

The present invention generally relates to conducting secure transactions, and particularly relates to securely managing wireless device transactions involving stored-value data objects.

As portable electronic devices become more fully integrated into the everyday lives of people, these devices will be used in a broader range of transactions. For example, one might integrate payment functions into a portable communication device such as a cellular telephone. A user can then pay for selected goods or services using the phone's payment functions.

Security issues complicate using portable devices in commercial transactions. For example, if the user's device contains payment information, how is that information conveyed to a vendor system in a manner secure from unwanted eavesdropping or monitoring? In general, significant issues arise in providing end-to-end security for such transactions.

Particular challenges arise in securely delivering and retrieving information to and from a portable device. The need for such delivery and subsequent retrieval might arise in the context of delivering a stored-value data object to the device for later redemption by the user. Here, the data object might function analogous to a physical ticket. Indeed, a vendor might issue an electronic ticket or other token for delivery to the user's device for subsequent redemption. Upon redemption of the electronic ticket, the user gains access to or receives the desired goods or service.

However, the use of electronic tickets or other stored-value data objects requires significant security provisions throughout the issuing and redeeming processes. An approach to securely managing the use of stored-value data objects with portable devices requires a solution that addresses these and other security concerns. Yet, any such approach should make the use of such data objects relatively convenient and flexible from the user's perspective.

BRIEF SUMMARY OF THE INVENTION

The present invention provides methods and apparatus for securely managing wireless device transactions involving the use of stored-value data objects. In some embodiments, the stored-value data object functions as an electronic ticket or token, and methods and apparatus are provided for securely issuing, storing, and redeeming the electronic ticket.

In at least one embodiment, the wireless device requests a desired stored-value data object from a ticket issuing system. The ticket issuing system ensures secure delivery to the requesting device by encrypting the requested data object using a public key provided by the wireless device in association with the request. Only the requesting wireless device has the corresponding private key, and thus only that device can decrypt and subsequently use the data object. The wireless device may include a security element, which offers tamper-resistant, secure decrypting and storage for the data object, and secure storage of the private key.

The ticket issuing system may offer local access, in which case the wireless device might use RF or optical (e.g., infrared) signaling to communicate with the ticket issuing system. In at least one embodiment, the ticket issuing system is a remote server or other system accessible through the Internet, and the wireless device accesses it through a wireless communication network. For example, the device might incorporate a RF transceiver adapted to communicate with a cellular communication network. Communication between the internet-based ticket issuing system and the wireless device might use the Wireless Application Protocol (WAP). If WAP is used, the wireless device might provide its associated public key to the ticket issuing system in a user certificate, in accordance with WAP Public Key Infrastructure (WPKI) methods.

After receiving the stored-value data object (e.g., electronic ticket) in encrypted form from the ticket issuing system, the wireless device transfers the encrypted data object to its security element, which may be integrated in the wireless device or removeably connected therewith. In any case, the security element provides for secure storage of the data object and does not permit viewing, retrieving, or otherwise modifying the stored data object except in accordance with its security rules. As noted, the security element also may provide secure storage of the private key used to decrypt the data object as received from the ticket issuing system. Additionally, the security element may allow a user of the wireless device to browse or view selected fields or portions of the stored data object, but prevents unauthorized copying of the stored data object by not allowing unencrypted access to the full data object.

Once the security element contains a stored data object, such as an electronic ticket, the wireless device user can redeem the data object for associated goods or services at a compatible ticket redeeming system. The ticket redeeming system ensures that the data object being redeemed is valid, and cooperates with the security element in the redeeming wireless device to ensure that unauthorized copies of the stored data object cannot be extracted by eavesdropping on the communication between the wireless device and the ticket redeeming system. Further, the security element in the wireless device ensures that unauthorized copies of the stored-value data object are deleted or otherwise not retained. Communication between the wireless device and the ticket redeeming system may use RF, infrared, or other wireless signaling. In at least one embodiment, the wireless device includes an RF interface, such as a Bluetooth interface, for communicating with the ticket redeeming system. Communication between the ticket redeeming system and the wireless device may be based on WAP, or on other standardized or proprietary protocols.

In at least some embodiments, the wireless device initiates redemption of the stored data object by sending a redemption request to the ticket redeeming system. The wireless device may also provide its associated public key to the ticket redeeming system as part of this request. In response, the ticket redeeming system sends a certificate containing its associated public key to the wireless device. The ticket redeeming system may also send a nonce ("number used once") or other generated value (e.g. pseudorandom value) to the wireless device.

The security element encrypts a combination of the generated value supplied by the redeeming system and the ticket using the public key received from the redeeming system. The wireless device then sends the encrypted data object to the ticket redeeming system using whatever protocols are associated with the particular interface used to communicate with the ticket redeeming system. Generally, these protocols should support transmission verification to insure that the ticket redeeming system successfully receives the encrypted data object. Upon transmitting the data object to the ticket redeeming system, the security element in the wireless device erases or otherwise clears its stored copy of the data object.

The ticket redeeming system decrypts the received data object using a private key corresponding to the public key it provided to the wireless device. During decryption, the ticket redeeming system separates the data object from the nonce and verifies that the data object contains an authentic signature or other marking data from a legitimate ticket issuing system, or from a legitimate ticket redeeming system. If the data object is a multi-use object, such as a multi-use electronic ticket, the ticket redeeming system alters the data object as required, signs it with its own private key, and then returns it in encrypted form to the wireless device, where it is decrypted and stored in the security element, ready for subsequent redemption.

In any case, the ticket redeeming system may offer or otherwise enable access to the goods or service associated with redeeming the data object, such as by opening a gate or by returning a rapid verification token (RVT), in exchange of the data object, to the wireless device for subsequent use in accessing the goods or service. A RVT as defined herein typically comprises a different type of information than the data object discussed above, and has associated transfer and verification procedures making it amenable to quick verification.

A RVT might be used in situations where one or more subsequent rapid verifications are desired after initial redemption of a stored data object using full security. For example, a ticketed passenger might use his or her portable device to perform full redemption of a stored electronic ticket at a ticket redeeming system positioned in advance of the boarding area. Upon redeeming the electronic ticket, the ticket redeeming system returns a RVT to the passenger's portable device, which may then be rapidly verified immediately prior to boarding the aircraft. Of course, usage of RVTs extends to a broad range of other activities such as enforcing ticketed access at sporting events.

In at least some embodiments, the ticket redeeming system returns a seed value to the wireless device, and may optionally return graphical data or pattern generating information. The seed value may be a pseudorandom value. The security element in the wireless device uses the returned seed value to drive some form of pattern or sequence generator. The pattern/sequence generator preferably incorporates time-of-day dependency in its generation function, such that the sequence or pattern generated by it depends on both the seed value and the time-of-day. If a human operator is meant to redeem or authenticate the RVT, the security element can generate an authentication pattern or otherwise manipulate a graphical element that it displays in a manner dependent upon the seed value, and on time-of-day if desired. Thus, only security elements having valid seed values are able to present the proper pattern or graphical manipulation to the verifying human operator at the verification instant.

Incorporating time-of-day considerations into sequence/pattern generation functions protects RVT verification against replay attacks. In general, the pattern/sequence generator generates the desired pattern or sequence at the time of verification. In so doing, the time-of-day used in generation is very close to current time. For example, the pattern/sequence might be generated a half-second before actual verification. Verification might then be made to depend on the time-of-generation being within a certain window of time. This dependency prevents a user from outputting an otherwise valid verification pattern or sequence for recording and subsequent playback to a verifying system.

Where a subsequent automated system is meant to verify the RVT, the wireless device may simply transmit a verification sequence to the verifying system. Generally, the verification sequence contains at least one pseudorandom element generated in dependence on the seed value, and preferably also in dependence on the time-of-day. The verifying system receives the verification sequence and checks its validity. It does so by locally generating the same pseudorandom element or elements in the verification sequence, which is feasible because the verification system has knowledge of the seed value that was transmitted to the wireless device by the ticket redeeming system. This seed value is used system-wide, that is, it is given to all wireless devices over a moderately long pre-determined period of time. The period of time may be much longer than the typical user delay between redeeming the ticket at the first TRS and subsequently redeeming the RVT. The RVT-checking TRS would allow acceptance of both the present and the previous period seeds over a relatively brief period following a seed-change; this would accommodate users who obtained their seed just prior to a seed change.

If the pseudorandom element is generated in dependence of time-of-day as well as the seed value, the wireless device may transmit the time-of-day it used in generating the pseudorandom element included in its verification sequence. The verifying system can use this received-time-of-day value and the known seed value to generate its own pseudorandom element for comparison against the pseudorandom element received from the wireless device. Further, the verifying system may qualify the time-of-day received from the wireless device to make sure it is not old (i.e., stale).

Alternatively, verifying system may be synchronized to the same time reference as the wireless device, such that the time-of-day maintained by the verifying system closely matches the time-of-day maintained by the wireless device. If such synchronization is not desirable, the verifying system may allow for a defined time variance between it and the wireless device. In any case, the verifying system may also use the time-of-day in determining whether a received verification sequence is valid, thus preventing a given verification sequence from being copied and reused by other wireless devices.

DETAILED DESCRIPTION OF THE INVENTION

The present invention provides systems and methods enabling certain transactions related to wireless e-commerce.

The following detailed description and accompanying drawings provides specific, exemplary details regarding implementations for at least some embodiments of the present invention. However, the scope of the present invention extends well beyond these specific details. For example, it should be understood that where wireless communication systems are involved, no particular wireless communication interface standard is necessary for practicing the present invention.

Moreover, the discussion below refers specifically to electronic tickets, but this term should be understood to be a particular embodiment of the more general concept of any stored-value data object. Thus, the term "electronic ticket" as used herein encompasses other stored-value data objects, such as electronic cash, electronic tokens, and any other data item or object that may be used as a medium of exchange in e-commerce, and in other for-value transactional activities.

Figure 1:
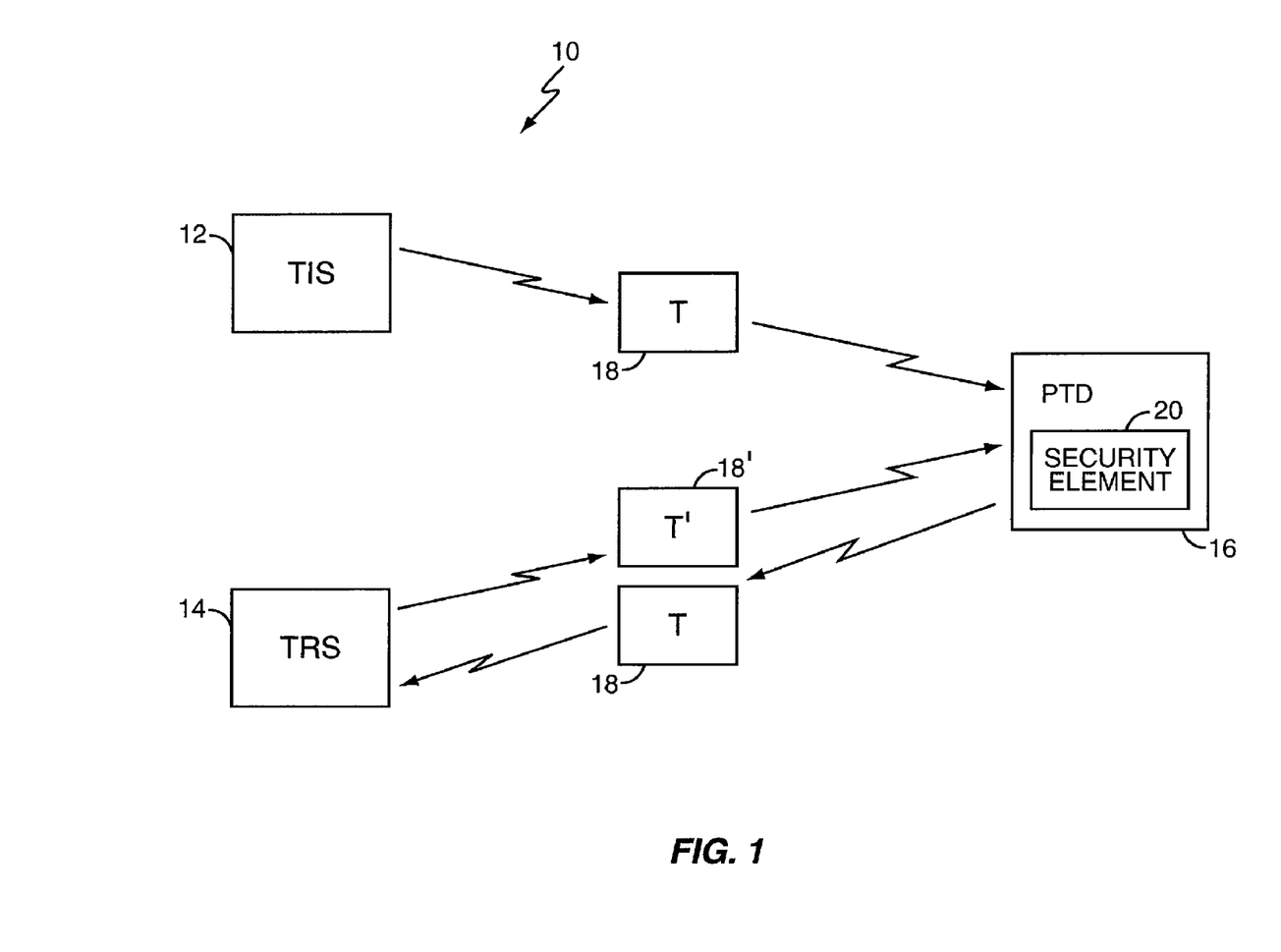
FIG. 1 is a diagram of an exemplary system supporting the secure handling of stored-value data objects in accordance with the present invention.

FIG. 1 illustrates a simplified, exemplary system 10 for practicing one or more embodiments of the present invention. System 10 comprises a ticket issuing system (TIS) 12, a ticket redeeming system (TRS) 14, and a user device 16. In this context, the user device 16 is referred to herein as a "personal trusted device" (PTD) 16. The PTD 16 contains a security element 20, which is adapted to act as a trusted agent of the TIS 12 and TRS 14 in stored-value data object transactions, such that the security element 20 cooperates with the TIS 12 and TRS 14 in securely issuing, storing, and redeeming an electronic ticket 18. It should be understood that the PTD 16 represents essentially any device type having the appropriate wireless communication capabilities. Thus, PTD 16 might be an appropriately configured radiotelephone or other mobile terminal, personal digital assistant, hand-held, laptop, other personal computer device, or other type of electronic device.

In managing the secure transfer, handling, and redemption of electronic tickets, the systems and processes used must ensure reliable and convenient electronic ticket generation, issuance, and redemption, which includes preventing fraud and misuse. In general, the TIS 12, TRS 14, and security element 20 cooperate to achieve the following goals:

The ticket recipient must be assured that the ticket issuer is legitimate.
The ticket must be delivered only to the legitimate user, i.e., it shall not be possible for a person other than the user to receive and make use of the ticket.
The ticket must be prevented from copying by the user, whether such copying might be undertaken legitimately or fraudulently.
The user must be assured that the ticket collector (redeeming system) is legitimate.
The ticket must be delivered only to the legitimate ticket collector, i.e., it shall not be possible for an entity other than the legitimate ticket collector to receive and make use of the ticket.
The ticket collector must have a reliable mechanism for ensuring that the ticket is legitimate.
If the ticket collector returns the ticket to the user, it must ensure that the ticket is delivered only to the legitimate user, i.e., it shall not be possible for a person other than the user to receive and make use of the returned ticket.

In addition to the above secure handling requirements, rapid ticket verification is also a requirement in many ticketing services. Rapid verification is especially advantageous in mass transit systems, sports events, concerts, etc. With rapid verification, which is discussed in more detail later, there may be a tradeoff between verification security and verification speed. In general, the concept entails subjecting an electronic ticket to a high level of initial security to insure verification, and then providing the user with a potentially less secure, short-lived, rapid verification object that may be subsequently verified more quickly than the original electronic ticket.

Figure 2:
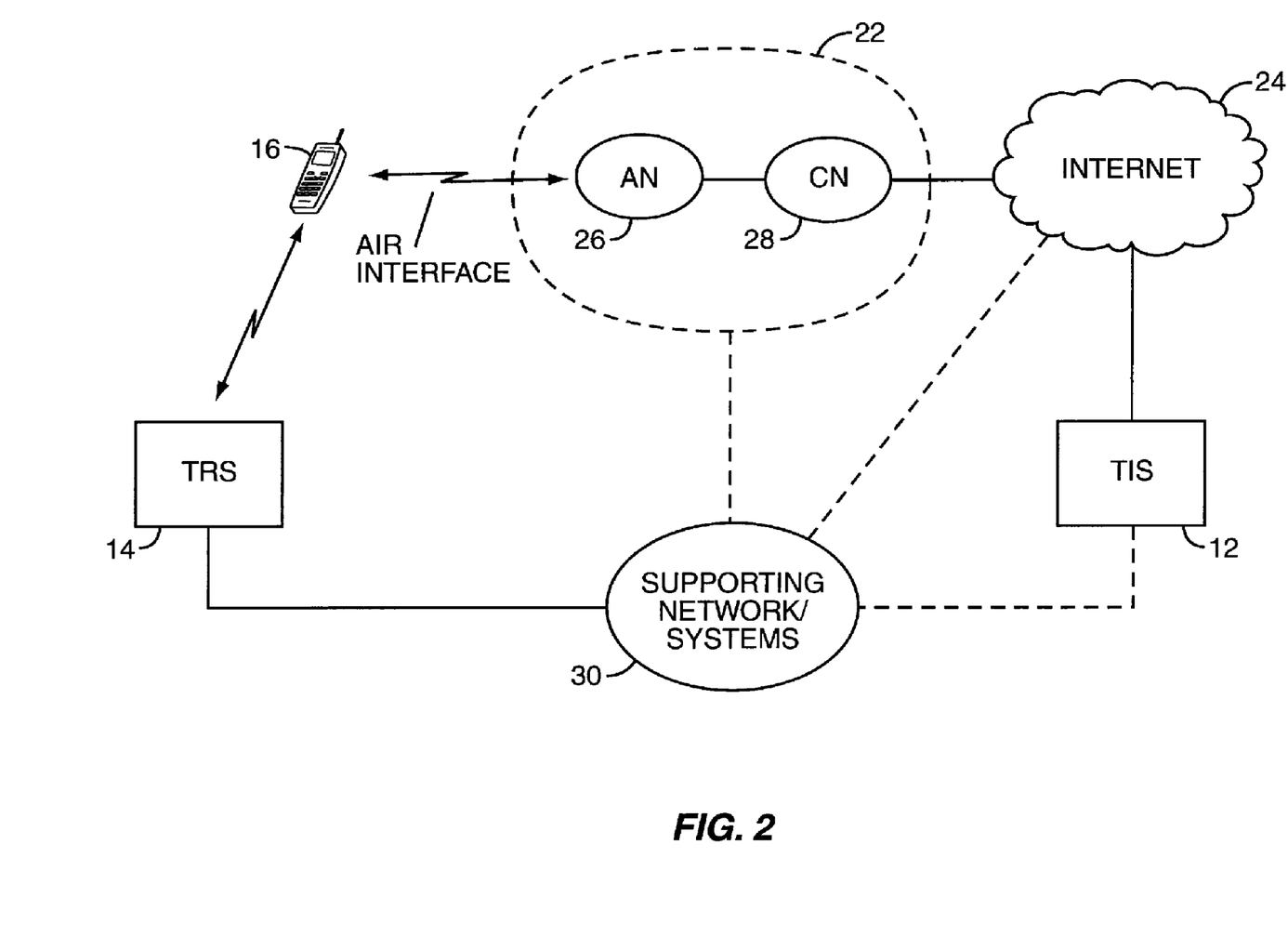
FIG. 2 is a more detailed diagram of an exemplary embodiment of the system of FIG. 1.

FIG. 2 is a more detailed illustration of an exemplary embodiment of secure ticket transactions. In this instance, the PTD 16 may be a mobile terminal or other cellular radiotelephone. As such, the PTD 16 wirelessly communicates with the TIS 12 by accessing the wireless communication network 22, which typically comprises an access network (AN) 26 and a core network (CN) 28. The wireless communication network 22 provides access to the TIS 12 via the internet 24 or by some other network connection. The wireless communication network 22 may be any one of a number of standardized network implementations, including GSM, CDMA (IS-95, IS-2000), TDMA (TIA/EIA-136), wide band CDMA (W-CDMA), GPRS, or other type of wireless communication network.

Any number of end-to-end protocols may be used in supporting ticketing transactions conducted between the PTD 16 and the TIS 12. For example, the TIS 12 may be a WAP-enabled server, thereby allowing WAP-enabled PTDs 16 to conduct ticketing transactions with the TIS 12 based on WAP standards in conjunction with special MIME types defined for the ticketing messages. In particular, the reader is referred to the standards document entitled "Wireless Application Protocol Public Key Infrastructure Definition," WAP-271-WPKI, Version 24 Apr. 2001, as promulgated by the WAP Forum. Of course, other protocols may be used, and indeed numerous open and proprietary protocols are available for supporting transactions between the PTD 16 and the TIS 12.

Moreover, it should be understood that while configuring the TIS 12 as an Internet-accessible ticket issuing system is attractive in terms of flexibility and broad access, the TIS 12 might be implemented as part of the wireless communication network 22. For example, the TIS 12 may be implemented as one of a number of network entities within the core network 28. In that case, some security concerns associated with the TIS 12 are eliminated, or at least minimized, but access to the TIS 12 may be more restricted. For example, the TIS 12 might be accessible only to subscribers of the wireless communication network 22.

Once the PTD 16 receives an electronic ticket from the TIS 12, it transfers the ticket 18 to its security element 20, where it is decrypted and securely held for subsequent redemption. To that end, the PTD 16 further supports wireless communication with the TRS 14 for redemption transactions. The TRS 14 may be linked to other systems via a supporting network 30, and in fact may be connected to one or more of the Internet 24, the TIS 12, and the wireless communication network 22. While not shown, it should be understood that the TRS 14 may also be linked directly or indirectly to other TRSs 14, and to other types of equipment associated with ticket redemption, and, optionally, may be linked with rapid verification systems discussed later herein.

Figure 3:
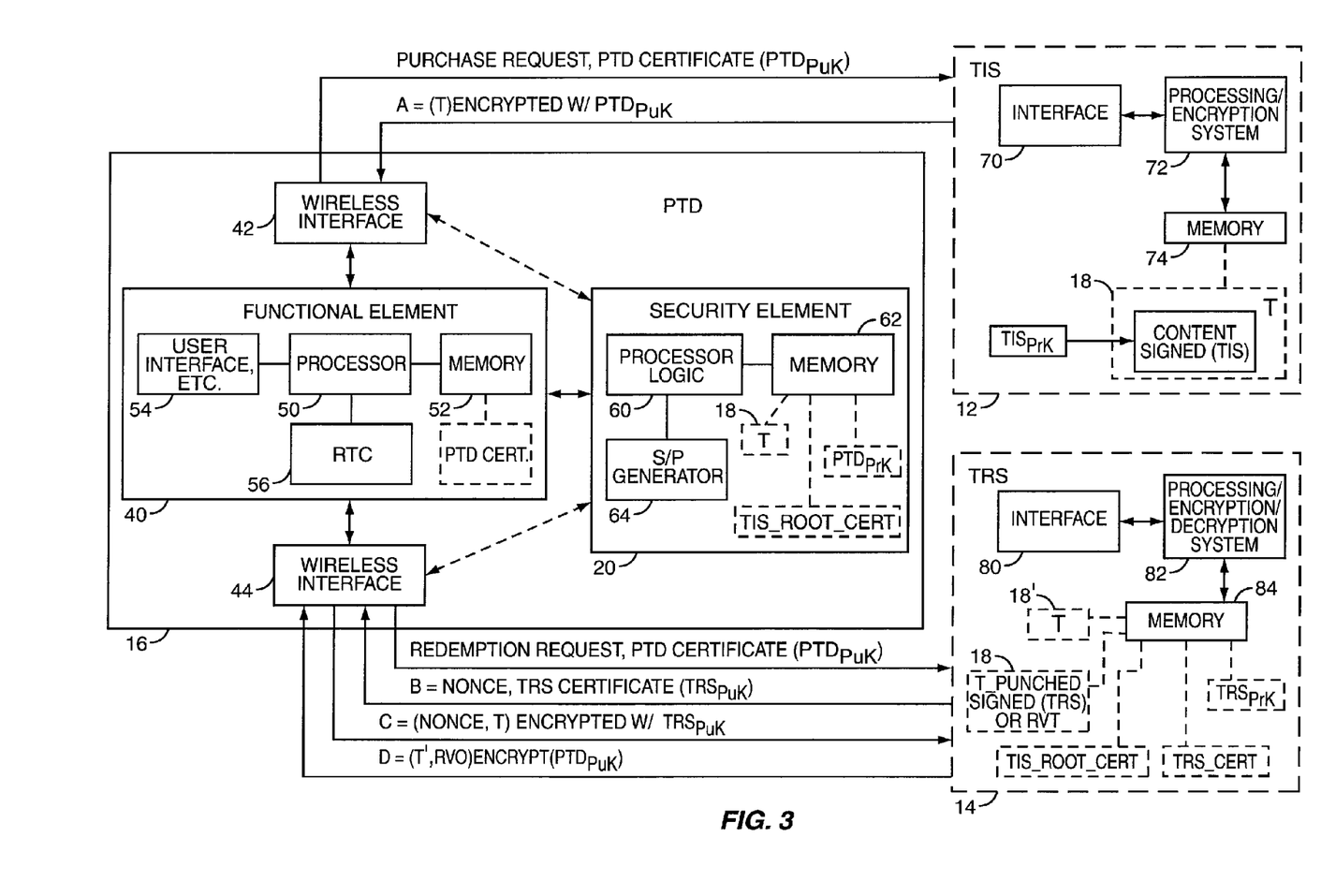
FIG. 3 is a diagram of exemplary embodiments of the ticket issuing system, ticket redeeming system, and personal trusted device shown in FIGS. 1 and 2.

FIG. 3 provides more detail regarding exemplary embodiments of the TIS 12, the TRS 14, and the PTD 16. Additionally, FIG. 3 defines exemplary information exchanged between the PTD 16 and the TIS 12 and TRS 14.

Specific embodiments of the PTD 16 will vary significantly because the term "PTD", as used herein, encompasses a broad range of device types. In an exemplary embodiment, the PTD 16 comprises a functional element 40 and wireless interfaces 40 and 42, in addition to the security element. As used herein, the term "functional element" essentially describes the whole of the PTD 16 apart from the security element 20. As will be explained later, the PTD 16 may use the same wireless interface 42 or 44 to communicate with both the TIS 12 and the TRS 14, but will oftentimes incorporate separate wireless interfaces. Generally, the need for different wireless interfaces is determined based on whether the TIS 12 and the TRS 14 are both local systems, both remote systems, or a mix of remote and local systems. For example, as described earlier, the PTD 16 may communicate with the TIS 12 using WAP services supported by the wireless communication network 22, while communicating with the TRS 14 at a redemption site via a local communication link.

The characteristics of functional element 40 will vary depending upon the nature of the PTD 16. That is, functional element 40 may be a cellular telephone, a personal digital assistant (PDA), or other type of electronic device dependent on the intended purpose of the PTD 16 in question. Generally, the functional element 40 comprises some type of processor or processors 50, memory 52, a user interface 54 and a real-time clock (RTC) 56. Details of the user interface 54 also vary with the intended purpose of the PTD 16. For example, if the PTD 16 is a cellular telephone or other mobile terminal, the user interface 54 typically comprise a display screen, keypad, and audio input/out systems. Similarly, if the PTD 16 is a PDA or other mobile computing device, the user interface 54 generally includes display and input/output functions.

The security element 20 in the PTD 16 may be implemented in any number of ways. For example, the security element 20 may be integrated with the other systems of the PTD 16, or may be a removable smart card or other modular device. In any case, the security element 20 may be implemented as a tamper-resistant secure module that provides for highly secure storage of electronic tickets and other sensitive data. In an exemplary embodiment, the security element 20 comprises a processor, or other logic 60, memory 62, and a sequence/pattern generator 64. Functions associated with the security element 20 are described in more detail later in association with describing transactions involving the TIS 12 and TRS 14.

In an exemplary embodiment, the TIS 12 comprises a WAP-enabled server, or other network-accessible ticket issuing system. In general, the TIS 12 includes an interface 70 configured for the type of network with which the TIS 12 communicates. In some embodiments, the interface 70 may include wireless communication functionality to support local wireless communication with PTDs 16. The TIS 12 further comprises a processing/encryption system 72 and memory 74.

Similarly, the TRS 14 comprises an interface 80, a processing system 82 providing encryption and decryption services, and memory 84. Of course, both the TIS 12 and the TRS 14 may be implemented differently depending on the specific capabilities and communication methods desired.

Independent of the above implementation details, a typical electronic ticket transaction involves a purchase request from the PTD 16 to the TIS 12, and subsequent delivery of the requested electronic ticket 18 from the TIS 12 to the PTD 16. Later, a user of the PTD 16 presents the electronic ticket 18 to the TRS 14 for redemption. A number of mechanisms are used within the present invention to ensure end-to-end security for issuing, storing, and redeeming electronic tickets (i.e., stored-value data objects).

Figure 4:
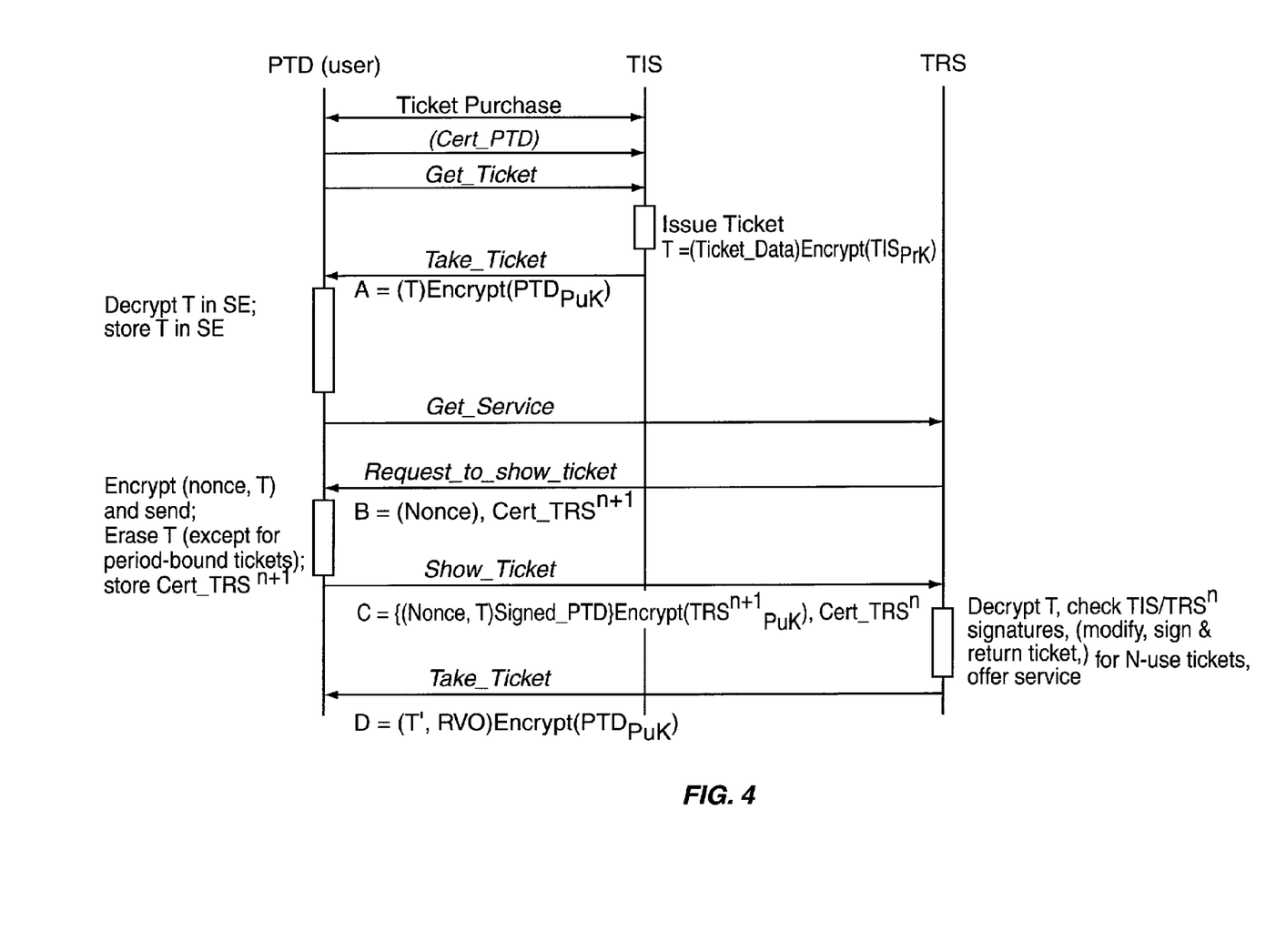
FIG. 4 is an exemplary call flow diagram detailing the issuance and redemption of electronic tickets or other types of stored-value data objects.

FIG. 4 illustrates an exemplary call flow that might be practiced in one or more embodiments of the present invention. The overall set of electronic ticket transactions begins with the PTD 16 generating and transmitting a purchase request for receipt by the TIS 12. A user certificate that includes a public key associated with the PTD 16 is transmitted in conjunction with the purchase request, or is otherwise made available to the TIS 12. The PTD certificate may be a certificate issued by the operator of the TIS 12 or an associated system, or may come from a trusted third party such as VISA or MASTERCARD. In any case, once the TIS 12 is assured of payment for the electronic ticket 18, which procedures are not germane to the present invention, it generates the requested electronic ticket 18.

Referring back to FIG. 3 it might be noted that the ticket 18 may be generated and held in memory 74. Once the ticket 18 is generated with the desired content and signed or otherwise authenticated by the TIS 12, it is encrypted using the public key ($PTD_{PuK}$) associated with the requesting PTD 16. Because only the requesting PTD 16 has the corresponding private key, only the requesting PTD 16 will be able to receive and make use of the encrypted ticket 18. Thus, at Step A in FIG. 4, the TIS 12 issues the requested electronic ticket 18 in encrypted format. Note that the ticket 18 consists of data that is digitally signed by the TIS 12, the digital signature being performed by encrypting the ticket data (TICKET_DATA) with a private key ($TIS_{PrK}$) belonging to and securely held by the TIS 12.

The PTD 16 receives the encrypted ticket 18 via the wireless interface 42, and may pass the encrypted ticket 18 directly to the security element 20, or indirectly through the functional element 40. In one embodiment, the TIS 12 sends the encrypted electronic ticket to the PTD 16 as a special Multipurpose Internet Mail Extension (MIME) type, which message type triggers the transfer of the encrypted ticket 18 to the security element 20. In any case, the security element 20 decrypts the received ticket 18 using its securely held private key. The security element 20 may hold a root certificate (TIS_ROOT_CERT) corresponding to the TIS 12, which certificate includes the private key needed to decrypt the electronic ticket 18 received from the TIS 12.

The decrypted ticket 18 is held in security element memory 62. It is noteworthy that the security element's fixed, predefined input/output functions never yield the decrypted electronic ticket 18 to the outside world. Hence, the ticket 18 stored in the security element 20 is inaccessible to would-be copiers, although the security element 20 may make selected fields or portions of the ticket 18 available for browsing by the user of PTD 16.

Subsequent to receiving the ticket 18 from the TIS 12, the user of the PTD 16 presents the electronic ticket 18 to the TRS 14 for redemption. Ticket redemption typically begins with the PTD 16 issuing a redemption request to the TRS 14, which might take the form of a WAP Session Protocol (WSP) Get request from the PTD 16 to the TIS 12, as shown in FIG. 4 by the Get_Service message. The above Get message may be issued as a result of the user independently navigating to a TIS website, or by the receipt by the PTD 16 of a WAP Push message issued by the TIS 12, containing the url of the TIS 12, and the user selecting the said url on his PTD.

As was mentioned early, the PTD 16 preferably communicates with the TRS 14 wirelessly through wireless interface 42 or 44. If the TRS 14 is remote, the PTD may access it as it would a remote TIS 12 through the wireless communication network 22, in which case the PTD 16 uses wireless interface 42. If the TRS 14 is local, the PTD 16 uses wireless interface 44, which may comprise a radio frequency interface, an optical interface, some combination thereof, or may be based on some other wireless technology. Wireless technologies of particular interest in this context include Bluetooth and 802.11 wireless networking standards, and additionally include the infrared communications standards promulgated by the Infrared Data Association (IrDA). Of course, it should be understood that communication between the PTD 16 and the TRS 14 might be based on other standards, including proprietary communication protocols.

Upon receiving the redemption request from the PTD 16, the TRS 14 sends a message, B, termed "Request To Show Ticket" to the PTD 16, which request includes a generated value and a certificate (Cert_TRS$^{n+1}$) associated with the particular TRS 14. The generated value may be a nonce, for example. The certificate transferred from the TRS 14 to the PTD 16 includes a public encryption key (TRS$_{PuK}$) associated with the TRS 14.

In response, the security element 20 within the PTD 16 creates a composite data object, (Nonce, T), comprising the received generated value concatenated with the electronic ticket 18. This composite data object is then digitally signed by the PTD 16 using the private key of the PTD 16. Preferably, a standard format such as PKCS 7, is used, whereby the certificate containing the PTD's public key, Cert_PTD, is appended to the signed object. The signed composite data object is then encrypted with the public key belonging to the particular TRS 14, the said public key being contained in the certificate, Cert_TRS$^{n+1}$, sent from the TRS 14 to the PTD 16 in message B in the previous step. In this discussion, the present TRS 14 is identified by index number (n+1) and a previous TRS, for multi-use tickets, by (n).

Following encryption of the signed composite data object, the PTD 16 returns the encrypted composite object to the TRS 14. For multi-use tickets described below, the certificate of the previous ticket redeeming system, Cert_TRS$^n$, is also sent as a component of message C. The TRS 14 decrypts the received generated value and electronic ticket 18 using the corresponding private key (TRS$_{PrK}$), known only to that TRS 14, and checks the authenticity and integrity of the received electronic ticket, as well as verifies the returned generated value.

In particular, the TRS 14 checks whether the received electronic ticket includes an authentic signature or other verification information from a legitimate TIS 12 and/or from another TRS 14, which might have signed a multi-use ticket after modifying it, as described below. In so checking, the TRS 14 may use a locally stored copy of the root certificates of one or more TISs 12 and the certificate of the previous TRS received from the PTD 16.

The TRS 14 may also check the PTD's signature on the composite data object returned by the PTD 16 to verify possession by the PTD 16 of the private key corresponding to the public key contained in the submitted PTD certificate.

If the electronic ticket 18 being redeemed at the TRS 14 is a one-time use ticket, the TRS 14 verifies that the ticket is valid and provides a signal or other indication to an associated system that the presenter of the ticket 18 should be granted access to the goods or service corresponding to the received ticket 18, or that a RVT should be issued. In conjunction with transmitting the ticket 18 from the PTD 16 to the TRS 14 in association with its redemption, the security element 20 erases the secure copy of the ticket 18 that it holds within its memory 62. This prevents unauthorized duplicate copies of the ticket 18 remaining during or after redemption.

In some instances, the electronic ticket 18 is a multiple use ticket. If so, the TRS 14 may return a redeemed ticket 18'. The redeemed ticket 18' may comprise a "punched", that is, an altered copy of the original electronic ticket 18. For example, the TRS 14 may modify the original electronic ticket 18 to show that it has been redeemed for the nth time, where n is a number from one (1) to the maximum number of times that the ticket 18 may be used. In returning a multi-use ticket 18', the TRS 14 may modify the ticket contents to contain an authentication signature associated with the TRS 14, which may be used to verify the redeemed ticket 18' at subsequent verification points.

In some cases, the result of redeeming a ticket 18 will be the issuance of a rapid verification object by the TRS 14. The PTD 16 receives the rapid verification object, and later uses it to generate a RVT, which may be quickly validated, albeit with less security, at a subsequent verification point. The rapid verification object sent from the TRS 14 to the PTD 16 itself might comprise the RVT, which is presented by the PTD 16 at a later verification point, but typically, the rapid verification object is a seed value, possibly with other information, from which the PTD 16 generates a valid RVT. Other information sent by the TRS 14 as part of the rapid verification object may include image data, image manipulation information, user-identifying data, etc. In any case, the TRS 14 might, depending on circumstances, return a redeemed ticket 18', a rapid verification object, neither, or both.

The use of RVTs might arise in association with tickets 18 issued for sporting events or for use at train stations, for example. In this instance, an original electronic ticket 18 might be subject to verification at a TRS 14 positioned at an open access area, whereupon the TRS 14 returns a rapid verification object to the redeeming PTD 16, which object, used in generating the RVT, may remain valid only for a defined period of time or a defined number of subsequent RVT validations.

Figure 5:
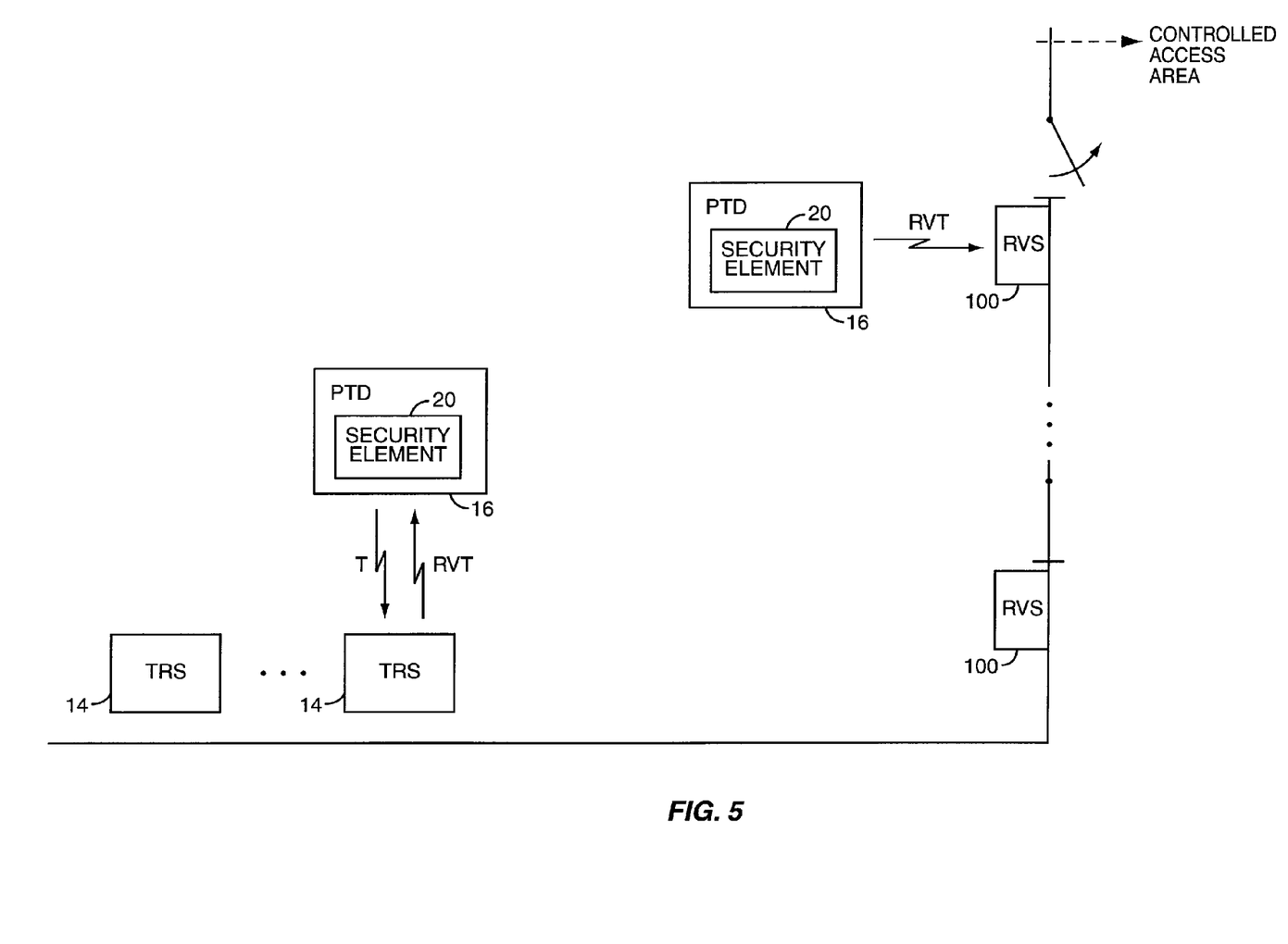
FIG. 5 is a diagram of an exemplary environment suited for the use of rapid verification tokens.

FIG. 5 illustrates more specifically an environment where RVTs might be useful. One or more TRSs 14 are available in an open area where users of PTDs 16 may initially redeem their electronic tickets 18. This initial redemption is typically a high security process, for example, one performed in accordance with the above description. The TRSs 14 return rapid verification objects to PTDs 16 redeeming valid electronic tickets 18. The PTD users may then present RVTs from their PTDs 16 to gain access to a controlled access area, for example. Arrangements of this sort are particularly useful in circumstances where event attendees or service users arrive at staggered times in advance of the event or service, and then subsequently queue up at a particular time. One might imagine the usefulness of the combination of high security verification followed by a subsequent lower security but faster verification at airport terminals, and at other mass transit facilities.

RVTs may be verified by rapid verification systems 100, but might also be verified by human operators. It should be understood that rapid verification systems 100 might simply be implemented as TRSs 14 but adopting both the secure verification protocols discussed earlier as well as lower-overhead rapid verification protocols. When returning rapid verification information to PTDs 16 from TRSs 14, the TRSs 14 may include a variety of data elements. In exemplary embodiments, the TRS 14 returns at least a seed value, and may also return visual pattern generating information, image information, and one or more associated scripts, the use of which information is explained below.

In one approach, the TRS 14 returns an image and a seed value in encrypted format as the rapid verification object to the PTD 16. The security element 20 in the PTD 16 includes a sequence/pattern generator 64 capable of generating pseudorandom sequences, or visual pattern information for display on the PTD screen, using the returned seed value. Additionally, the sequence/pattern generator 64 may be adapted to generate pseudorandom sequences based not only on this returned seed value, but on the time of day value that might be obtained from the real-time clock 56, for example. In many instances, the RTC 56 is itself synchronized to an overall network time or other referenced time, such as a GPS-based reference time. By making the RVT presented by the PTD 16 for verification dependent on time-of-day, the ability to fraudulently replay an earlier-generated RVT is eliminated.

In an exemplary scenario, a time-varying image is generated by the security element 20 in the PTD 16 by one of two approaches. A bit-mapped core image, which may be in data-compressed form, is transmitted from the TRS 14 to the PTD 16; this image is then manipulated by a program (e.g., computer instructions) native to the security element 20. This security element program takes as its inputs the output from the sequence/pattern generator 64, and the time time-of-day output or derived from the RTC 56. Alternatively, the program for creating and manipulating the time-varying image is itself sent from the TRS 14 to the PTD 16, possibly in compressed data form. This latter alternative is more suitable when the displayed image is an abstract, computer-generated pattern. It is noteworthy that the verification image displayed by the PTD 16, regardless of how it is generated, should have the qualities of easy human recognition, including clear discrimination among its various manipulated forms.

Figure 6:
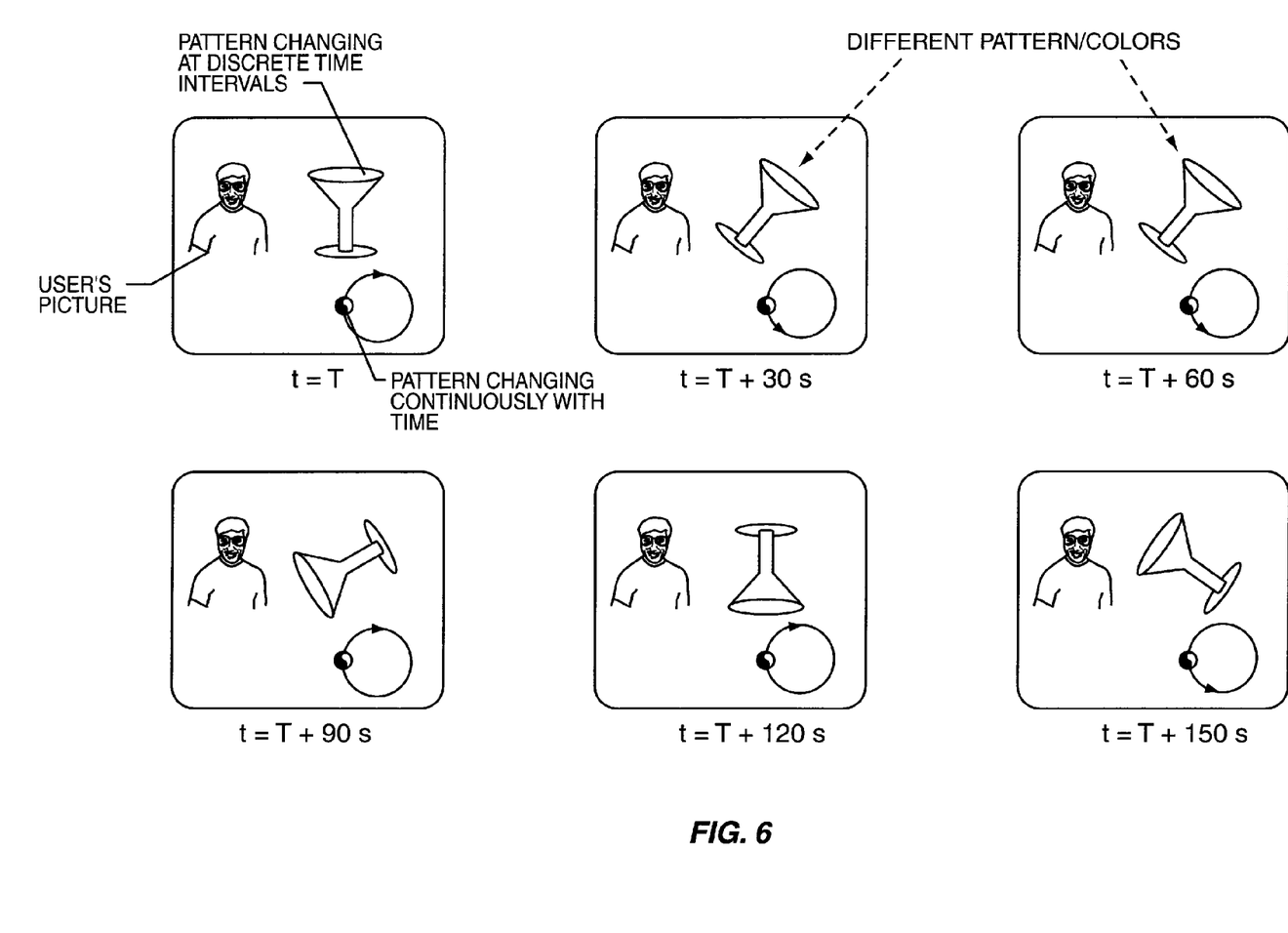
FIG. 6 is a diagram of an exemplary verification display associated with a rapid verification token.

FIG. 6 illustrates one embodiment of a human-verifiable RVT. The depicted images may be displayed on a display screen included within the user interface 54 in the PTD 16. In this exemplary embodiment, the displayed image includes (a) the user's picture, which is typically static; (b) a recognizable pattern that changes at discrete time intervals; and (c) a recognizable pattern changing continuously with time.

The user's picture in (a) above is accessed by the TRS 14 from a server whose location address, as typified by an Internet url, is contained in the PTD certificate sent by the PTD 16 to the TRS 14 in message C in association with signing the composite data object. This image, possibly in compressed form, is forwarded by the TRS 14 to the PTD 16 as a part of the rapid verification object (RVO) in message D.

As an example of (b) and (c), the illustration of FIG. 6 shows a wine glass and ball in association with the user's image. The wine glass takes on a series of rotational angles, wherein the sequence of rotational angles assumed by the wine glass are determined by the sequence/pattern generator 64, based on the seed value provided by the TRS 14 and a time-of-day value. The wine glass image changes at discrete time instants which are sufficiently spaced to allow easy human verification. The exemplary time interval shown in FIG. 6 is 30 seconds. In this case, the defense against replay attack is the presence of the user's picture as a component of the verification image displayed by the PTD 16.

Regarding the image component (c), it may be advantageous to pick the ball as following a circular orbit in an essentially continuous motion where the direction of rotation of the ball is determined by a pseudorandom sequence, and the position of the ball in its circular path is determined by the time-of-day. A continuously varying component in the verification image provides a defense against replay attacks comprising real time monitoring and rebroadcast of the image to multiple fraudulent users.

The human operator may have a rapid verification system 100, such as a hand-held device, having a display with similar images following the same pseudorandom sequence or sequences. In this manner, the human operator can look at the PTD's display and compare the verification image depicted there with the reference image displayed by the rapid verification system 100.

In ensuring that the displayed patterns on the rapid verification system 100 remain in sync with the patterns being generated by PTD 16 having valid RVTs, the rapid verification system 100 may synchronize its time of day to the same time reference used by the security element 20 in the PTD 16. Thus, the rapid verification system 100 may synchronize its time of day to a network time of day, such as the time maintained by the wireless communication network 22, or may also have a GPS-based time reference. Alternatively, the rapid verification system 100 may simply maintain a very accurate time of day, and allow for slight variations between its time of day and the times of day in the PTD 16. Thus, slight discrepancies between the PTD image and the verification image may be tolerated.

As mentioned earlier, an alternative approach has the PTD 16 provide the time-of-day to the rapid verification system 100. This allows the rapid verification system 100 to use the same time-of-day value as was used by the security element 20 in generating pseudorandom data from the seed value. With this approach, the rapid verification system can determine whether the time-of-day value provided by the PTD 16 is recent enough to be deemed legitimate. That is, if the time-of-day value received from the PTD 16 is too old, the rapid verification system 100 can reject the verification sequence or pattern provided to it as being a replay of an earlier verification sequence.

Use of a verification sequence is particularly well suited where verification is performed using automated processing. Thus, the RVT generated by the security element 20 and transmitted from the PTD 16 to the rapid verification system 100 might simply be a verification sequence having at least one pseudorandom element generated in dependence on the seed value provided by a legitimate TRS 14 and a PTD time-of-day. The verification sequence can include additional, non-pseudorandom information, such as protocol-defined headers, etc. As with the human-readable version, the rapid verification system 100 may determine whether a sequence is valid based on the known seed value and a synchronized time of day.

If the rapid verification system's time of day is not synchronized to the same reference used by the security element 20, rapid verification system 100 may compare the received sequence to one of several valid sequences representing a defined time window. In this matter, absolute synchronization of times between PTD 16 and rapid verification system 100 is not necessary; however, by defining the non-discrepancy tolerance to be suitably small (e.g., ±2 seconds), the rapid verification system 100 ensures that an earlier issued seed value has not been redistributed to another PTD 16 for fraudulent reuse.

As noted in detail above, the PTD 16 may include the actual time-of-day value used by the security element 20 in generating the pseudorandom element or elements as a preamble in the verification sequence it transmits to the rapid verification system 100. This technique is useful in that the rapid verification system's time-of-day may not exactly match the time-of-day reference used by the security element 20. The rapid verification system 100 will check the received verification sequence against its own reference sequence for the PTD-declared time-of-day (i.e., for the time-of-day value received from the PTD). If the received verification sequence is valid, this proves that the PTD 16 (security element 20) had the correct seed value. The rapid verification system 100 will then decide if the PTD-declared time-of-day is within acceptable limits of clock inaccuracy and processing delay. Verification sequences reflecting excessive delays would be rejected as they might result from replay fraud.

In an alternate exemplary approach, the rapid verification object returned by the TRS 14 is a paper ticket or other physical token that may be redeemed by the PTD user. In this approach, the TRS 14 may mark the physical token with authentication indicia that may change with time to prevent token reuse.

Given the broad scope of the present invention with regard to issuing, managing and redeeming electronic tickets or other stored-value data objects within the realm of e-commerce or in the context of other types of secure transactions, it should be understood that the exemplary details above are not limiting. Indeed, the present invention is limited only by the scope of the following claims, and the reasonable equivalents thereof.

What is claimed is:

1. A method of redeeming stored-value data objects, the method comprising:
   verifying a stored-value data object presented by a user device to a first redeeming system in accordance with first verification procedures;
   returning, to the user device, a rapid verification object;
   receiving, from the user device, a rapid verification token (RVT) generated by the user device from the rapid verification object; and
   verifying the RVT in accordance with second verification procedures, wherein the second verification procedures are faster than the first verification procedures.

2. The method of claim 1, wherein the rapid verification object comprises at least a seed value used by the user device in generating a verification sequence having a first pseudorandom element as the RVT, and wherein verifying the RVT in accordance with the second verification procedures comprises:
   receiving the verification sequence from the user device at a rapid verification system; and
   validating the RVT by comparing the first pseudorandom element to a second pseudorandom element generated by the rapid verification system using the same seed value used by the user device.

3. The method of claim 2, wherein the first pseudorandom element depends on the seed value and a user device time-of-day value, and further comprising:
   receiving the verification sequence including the first pseudorandom element and the user device time-of-day value at the rapid verification system;
   generating the second pseudorandom element at the rapid verification system in dependence on the seed value and the user device time-of-day value; and
   validating the RVT by comparing the first pseudorandom element to the second pseudorandom element, and by verifying that the user device time-of-day value is within a predefined range of a rapid verification system time-of-day value.

4. The method of claim 2, wherein the first pseudorandom element depends on the seed value and a user device time-of-day value, and further comprising:
   receiving the verification sequence including the first pseudorandom element at the rapid verification system;
   generating the second pseudorandom element at the rapid verification system in dependence on the seed value and a rapid verification system time-of-day value; and
   validating the RVT by comparing the first pseudorandom element to the second pseudorandom element.

5. The method of claim 4, further comprising synchronizing the rapid verification system time-of-day value to a time reference associated with the user device time-of-day value.

6. The method of claim 4, further comprising generating a plurality of second pseudorandom elements for comparison against the first pseudorandom element to account for time-of-day mismatch between the user device and the rapid verification system.

7. The method of claim 1 further comprising providing the rapid verification object to a second redeeming system acting as a rapid verification system, such that the rapid verification system can validate the rapid verification object held by the user device.

8. A method of redeeming stored-value data objects, the method comprising:
   verifying a stored-value data object presented by a user device to a first redeeming system in accordance with first verification procedures; and
   returning, to the user device, a rapid verification object adapted for more rapid subsequent verification using second verification procedures;
the method further comprising transferring at least a seed value from the first redeeming system to the user device as the rapid verification object.

9. The method of claim 8, wherein the user device generates a verification image having at least one pseudorandom attribute dependent on the seed value, and further comprising verifying by a human operator the verification image.

10. The method of claim 9, wherein the verification image is time varying.

11. The method of claim 10, wherein the time variation of the verification image has a relatively slow-changing discrete component and a relatively fast-changing continuous component.

12. The method of claim 10 further comprising transferring manipulation instructions governing one or more dynamic characteristics of the verification image generated by the user device from the first redeeming system to the user device as part of the rapid verification object.

13. The method of claim 10 further comprising the human operator verifying at least one dynamic attribute of the verification image that depends at least on the seed value.

14. The method of claim 10 further comprising transmitting image information from the first redeeming system to the user device as part of the rapid verification object, such that the verification image displayed by the user device comprises at least one dynamic image having at least one attribute dependent on both the image information and the seed value.

15. The method of claim 14, wherein transmitting image information comprises transmitting data representing at least one image for display by the user device.

16. The method of claim 15, wherein transmitting image information comprises transmitting a set of manipulation instructions used by the user device in generating at least one visual element comprising the verification image.

17. The method of claim 9 further comprising transferring image information from the first redeeming system to the user device as part of the rapid verification object.

18. The method of claim 9 further comprising transmitting a user-identifying image from the first redeeming system to the user device as part of the rapid verification object, such that the verification image displayed by the user device includes the user-identifying image.

19. The method of claim 18 further comprising accessing a user image associated with the user device at the first redeeming system, and transferring the user image to the user device as the user-identifying image.

20. The method of claim 19, wherein accessing the user image comprises accessing a server whose location address is contained in a certificate sent by the user device to the first redeeming system.

21. The method of claim 9 further comprising transmitting first image data from the first redeeming system to the user device as part of the rapid verification object, such that the verification image displayed by the user device includes a visual image dependent on the first image data.

22. A method of redeeming stored-value data objects, the method comprising:
   verifying a stored-value data object presented by a user device to a first redeeming system in accordance with first verification procedures; and
   returning, to the user device, a rapid verification object adapted for more rapid subsequent verification using second verification procedures;
wherein the user device generates a verification image dependent on the rapid verification object and the method further comprises:
   generating a reference image at a rapid verification system dependent on the rapid verification object; and
   verifying by a human operator that the verification image generated by the user device substantially matches the reference image generated by the rapid verification system.

23. The method of claim 22 further comprising providing the rapid verification object to the rapid verification system for use in generating the reference image.

24. The method of claim 22, wherein the user device generates the verification image further in dependence on a user device time-of-day value, the method further comprising generating the reference image in dependence on the rapid verification object and a rapid verification system time-of-day value.

* * * * *